(12) United States Patent
McDonough

(10) Patent No.: US 10,156,075 B1
(45) Date of Patent: Dec. 18, 2018

(54) ROOFING COMPONENTS COMPRISING A UV TREATED POLYETHYLENE THERMOPLASTIC AND A METHOD AND AN APPARATUS FOR MANUFACTURING THE SAME

(71) Applicant: Michael John McDonough, Lakewood, CO (US)

(72) Inventor: Michael John McDonough, Lakewood, CO (US)

( * ) Notice: Subject to any disclaimer, the term of this patent is extended or adjusted under 35 U.S.C. 154(b) by 77 days.

(21) Appl. No.: 15/186,016

(22) Filed: Jun. 17, 2016

Related U.S. Application Data

(60) Provisional application No. 62/181,401, filed on Jun. 18, 2015.

(51) Int. Cl.
| | | |
|---|---|---|
| *B29C 53/04* | (2006.01) |
| *B29C 69/00* | (2006.01) |
| *E04D 1/20* | (2006.01) |
| *E04D 1/28* | (2006.01) |
| *E04D 13/147* | (2006.01) |
| *B29K 105/16* | (2006.01) |
| *B29K 507/04* | (2006.01) |
| *B29K 105/00* | (2006.01) |
| *B29L 31/10* | (2006.01) |

(52) U.S. Cl.
CPC ......... *E04D 13/1478* (2013.01); *B29C 53/04* (2013.01); *B29C 69/001* (2013.01); *E04D 1/20* (2013.01); *E04D 1/28* (2013.01); *B29C 2793/0036* (2013.01); *B29C 2793/0081* (2013.01); *B29K 2023/06* (2013.01); *B29K 2105/16* (2013.01); *B29K 2105/256* (2013.01); *B29K 2507/04* (2013.01); *B29K 2995/002* (2013.01); *B29K 2995/0055* (2013.01); *B29L 2031/108* (2013.01)

(58) Field of Classification Search
CPC ......... E04D 13/1478; E04D 1/28; E04D 1/20; B29C 69/001; B29C 53/04; B29C 2793/0081; B29C 2793/0036; B29K 2995/002; B29K 2995/0055; B29K 2105/256; B29K 2507/04; B29K 2105/16; B29K 2023/06; B29L 2031/108; Y10T 428/24355

See application file for complete search history.

(56) References Cited

U.S. PATENT DOCUMENTS

| | | | |
|---|---|---|---|
| 5,181,659 A * | 1/1993 | Ohe | A01G 25/02 219/121.71 |
| 5,337,526 A | 8/1994 | Hartman | |
| 5,946,862 A | 9/1999 | Hoffman | |
| 6,536,177 B1 | 3/2003 | Italiane et al. | |
| 7,121,047 B2 | 10/2006 | Quinn | |
| 8,091,310 B2 * | 1/2012 | Jones | B29C 65/028 428/105 |
| 8,206,807 B2 | 6/2012 | Friedman et al. | |
| 2002/0115758 A1* | 8/2002 | Gorny | C08K 5/005 524/104 |
| 2003/0046878 A1 | 3/2003 | Zdeb et al. | |
| 2004/0009319 A1* | 1/2004 | Zanchetta | B32B 9/00 428/40.1 |
| 2004/0241476 A1* | 12/2004 | Friedman | B32B 27/12 428/515 |
| 2005/0072110 A1* | 4/2005 | Shiao | E04D 5/12 52/741.1 |
| 2005/0246999 A1* | 11/2005 | Hoffman | E04D 1/36 52/580 |
| 2007/0266562 A1* | 11/2007 | Friedman | E04D 1/20 29/897.3 |
| 2009/0178347 A1 | 7/2009 | Hoffman | |

OTHER PUBLICATIONS

[NPL-1] "Specialty Carbon Blacks for Ultraviolet Protection & Weatherability", CABOT (Mar. 5, 2015); <http://www.cabotcorp.com/solutions/products-plus/specialty-carbon-blacks/for-uv-weatherability>.*
"High Density Polyethylene Smooth Linder® Product Data Sheet," Agru America, Inc., Apr. 2013, 1 page.
"High-density polyethylene," Wikipedia, last modified Apr. 21, 2015, 3 pages [retrieved Apr. 28, 2015 from: en.wikipedia.org/wiki/High-density_polyethylene].
"Plastic Lumber Capabilities," Resco Plastics Incorporated, © 2015, 1 page [retrieved Apr. 28, 2015 from: rescoplastics.com/plastic-lumber-capabilites.

* cited by examiner

*Primary Examiner* — David Sample
*Assistant Examiner* — Donald M Flores, Jr.
(74) *Attorney, Agent, or Firm* — Sheridan Ross PC

(57) ABSTRACT

A roofing component formed of polyethylene thermoplastic treated to prevent degradation due to exposure to ultraviolet (UV) light and an apparatus and method of forming the same. The UV treatment may include one or more of a UV absorber and a UV inhibitor. In one embodiment, the UV absorber comprises carbon black that is mixed with the polyethylene thermoplastic. The roofing component may comprise step flashing or a shingle.

17 Claims, 7 Drawing Sheets

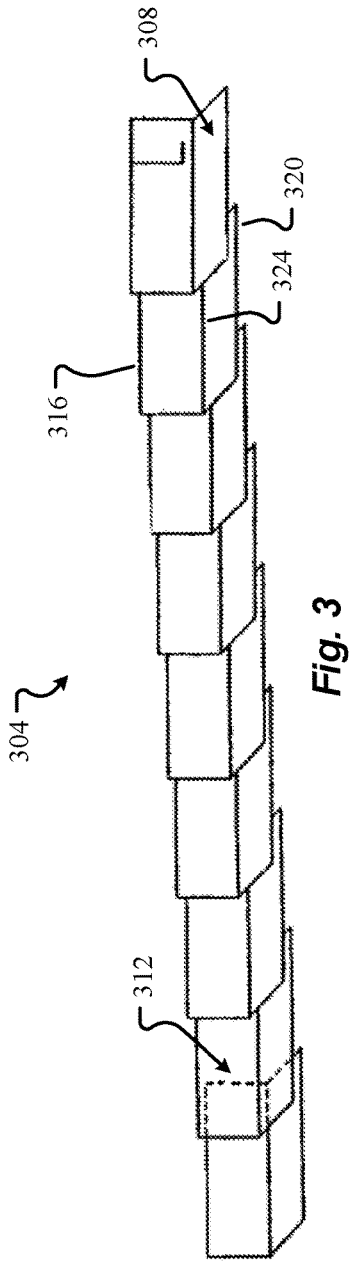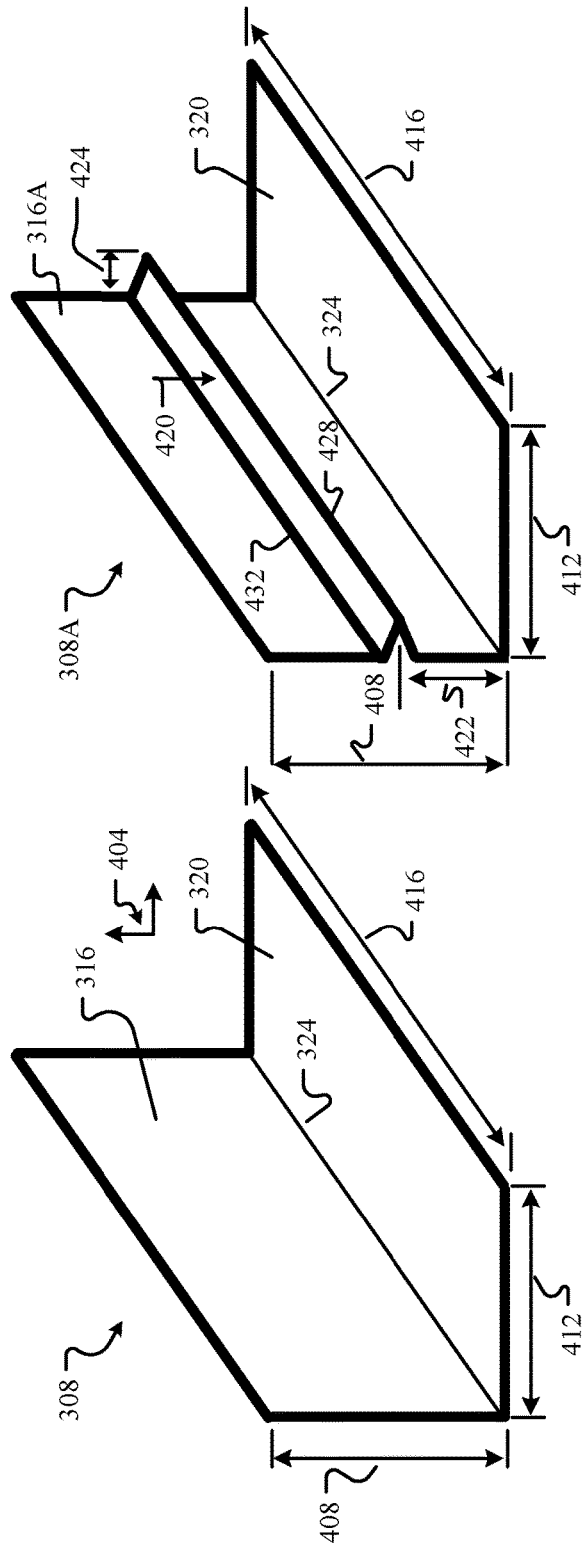

ROOFING COMPONENTS COMPRISING A UV TREATED POLYETHYLENE THERMOPLASTIC AND A METHOD AND AN APPARATUS FOR MANUFACTURING THE SAME

CROSS-REFERENCE TO RELATED APPLICATIONS

This application claims the benefit of priority under 35 U.S.C. § 119(e) to U.S. Provisional Patent Application Ser. No. 62/181,401, filed Jun. 18, 2015, which is incorporated herein in its entirety by reference.

FIELD

The present disclosure relates to roofing components formed of polyethylene thermoplastic which is treated to prevent degradation due to exposure to ultraviolet light and methods and apparatus for manufacturing the same. The polyethylene thermoplastic may comprise one or more of a low density polyethylene (LDPE), a high density polyethylene (HDPE), a high molecular weight polyethylene (HMW PE), and an ultra-high molecular weight polyethylene (UHMW PE). More specifically, the present disclosure relates to a method and apparatus for transforming a coil of polyethylene thermoplastic into roof flashing and other roofing components.

BACKGROUND

Roofs of buildings are typically formed of multiple materials and surfaces designed to maintain a barrier between the interior of the structure and the weather. One of the most pervasive and difficult elements to control is water. The tendency for water from rain or snow to seep into every available crack and crevice of a roof is a problem which has plagued many an unfortunate building owner. The damage resulting from such seepage may be severe, and often results in rotten wood, metal corrosion, damaged masonry, or damaged plaster or plasterboard. Costs of repairing these elements of a building damaged by water are generally high.

The problem of water infiltration is particularly acute at the intersection of an inclined roof slope and an upright wall, ridge, roof edge, vent, rake, eave, roof penetration, chimney, or other roof structure. Water tends to seep down along the structure or penetration, bypassing the roof, and finding its way into the roof. For example, and with reference to FIG. 1, in nearly every roofing application, there is a need to seal the joint and intersection (I) that is created between a generally planar roof (R1, R2) and any vertically extending structures such as dormers (not shown), chimneys (C), vents (V), and vertically projecting stories (S) that are elevated from any level of a lower roof (R1).

Conventional responses to such seepage include the adaptation of sections of a material impervious to water, known as "flashing" or "step flashing," to prevent the infiltration of water and foreign objects into these intersections (I) or joints. Sections of flashing are typically sold as "flashing cards" that are generally flat or L-shaped in cross section.

Flashing is designed to manipulate the flow of water in a certain direction on the roof. Flashing also protects sections of a building where the shingles abut a wall or an edge. Commonly, flashing is used adjacent to chimneys (C). Flashing is also used when the building has more than one roof level. For example, as illustrated in FIG. 1, a building (B) may have a lower roof (R1) intersected by a projecting story (S) with an upper roof (R2). Flashing is needed at the intersection (I) where the shingles of the lower roof (R1) abut both the projecting story (S) and chimney (C) of the building. Methods of using and installing flashing are generally known and are described in U.S. Pat. Nos. 5,337,526 and 7,121,047, and U.S. Patent Application Publication No. US 2009/0178347, each of which are hereby incorporated by reference, in their entirety.

As illustrated generally in FIG. 2, flashing (F) is used to create a downwardly-projecting channel. Flashing (F) is fitted to the joints and angles of an intersection (I) before shingles, tiles, and/or other roofing material (S) is installed. A vertically projecting portion of the flashing (F) is attached and sealed to the vertical structure, for example, the chimney (C). The vertical portion may be nailed to the upright surface against which it abuts. A generally horizontal portion of the flashing (F) is attached to the roof (R) using roofing nails before the roofing material is applied. Additionally or alternatively, the flashing (F) may be attached to the roof by any suitable adhesive, including tar-based adhesives. A roofer alternates between securing a piece of flashing (F) to the roof and laying a shingle (S) or other roofing material over the horizontal portion of the flashing (F).

Conventional flashing is generally formed from sheet metal made of at least one of aluminum, galvanized steel, stainless steel, zinc, terne, lead, and copper. Flashing formed from these metal materials suffers from several disadvantages. Metals used to form conventional flashing are expensive, thereby increasing the cost of the flashing. Flashing made from these metals is also heavy resulting in significant transportation expenses and difficulty at a work site. Because flashing is often cut and formed into complex shapes during installation to match roofing connections, labor costs associated with installation of conventional flashing can be high. Additionally, some of these metals are rigid and difficult to work with and form, reducing efficiency during initial installation or replacement. Some of the metals used to form conventional flashing preclude the use of mechanical fasteners (such as nails and screws) and require crimping or the use of sealants. Moreover, some metals used for conventional flashing are highly reflective and detract from the aesthetic appearance of the roof.

Conventional flashing also has a limited service life due to exposure to the elements and contact with other building materials. For example, metal flashing can be damaged through contact with green lumber, masonry, cement (which can each have high moisture levels), and treated lumber (due to chemicals used to treat the lumber that can react with the metal of the flashing).

Contact between conventional sheet metal flashing and fasteners made of a different metal can also result in a galvanic action that can corrode the flashing or the fastener and cause leaks. Unfortunately, conventional flashing and fasteners are produced using a range of materials that will have a galvanic interaction with each other. For example, fasteners made of metals which may be considered as non-reactive (for example, zinc and galvanized steel) will have a galvanic reaction with other metals frequently used in conventional flashing, such as tin, copper, steel, and stainless steel. Many individuals who install or repair roofs are not able to visually identify materials used to produce conventional flashing or know which materials are incompatible due to the risk of galvanic interaction. Compounding this problem, packaging of conventional flashing and other roofing materials that may provide warnings about galvanic interaction, identify the chemical makeup of the conventional flashing, or that provides warnings about detrimental material interactions is frequently not available to individuals installing or repairing roofs due to removal of packaging. Accordingly, even if packaging of conventional flashing were to provide warnings of galvanic reaction, because of the difficulty of identifying the material composition of other roofing materials and fixtures, it is unlikely that an individual installing a roof could be able to identify materials that are likely to galvanically react with the conventional flashing.

Some sheet metals used to form conventional flashing are coated with sealants to prevent corrosion of the metal. However, when the flashing is formed, the sheet metal is cut leaving edges that are uncoated and subject to corrosion. Further, when flashing is cut to form complex shapes by workers at a job site, the cut edges are also uncoated and a source of corrosion.

Finally, flashing made of lead is toxic and requires special handling techniques.

Accordingly, there is a need for a step flashing that is made of a durable, pliable, inexpensive, and lightweight material that is non-toxic and that improves efficiency of installation through reduced time required for installation and that is easy to work with in the field.

SUMMARY

Embodiments of the present disclosure contemplate a novel step flashing made of sections of polyethylene thermoplastic combined with at least one of an ultraviolet light (UV) absorber and a UV inhibitor. As will be appreciated by one of skill in the art, polyethylene's are semi-crystalline materials with excellent chemical resistance, good fatigue and wear resistance, and a wide range of properties due to the differences in length of the polymer chain. Polyethylene's generally have a density less than 1.0. Additionally, polyethylene's provide good resistance to organic solvents, degreasing agents, and electrolytic attack. Other benefits of polyethylene's include their light weight, resistance to staining, and low moisture absorption rates.

In one embodiment, the polyethylene thermoplastic is high density polyethylene (HDPE). Those of skill in the art will appreciate that HDPE offers excellent impact resistance, light weight, low moisture absorption, and a high tensile strength. Additionally, HDPE is resistant to acids. Accordingly, step flashing formed of HDPE offers improved resistance to damage due to acid rain compared to step flashing formed of metal material.

In one embodiment, the UV light absorber is carbon black added to the polyethylene thermoplastic. In another embodiment, the UV light absorber is a colorant added to the polyethylene thermoplastic. In still another embodiment, the UV light absorber is a material applied to at least one surface of the polyethylene thermoplastic.

The polyethylene thermoplastic step flashing of the present disclosure has many benefits for manufacturers, suppliers, installers, and building owners. For example, the polyethylene thermoplastic step flashing of this disclosure weighs less than known step flashing made of other materials, thereby decreasing transportation costs for manufacturers and suppliers. The low weight of the step flashing of the present disclosure also reduces the weight of the finished roof.

Additionally, step flashing comprising polyethylene thermoplastic improves the productivity of installers and reduces labor costs for several reasons. Labor costs are decreased because sections of polyethylene thermoplastic step flashing are pliable, lightweight, and can be formed into various sizes and folded to specific shapes for any roof. For example, in one embodiment, the step flashing of the present disclosure is provided as a flat sheet or card that may be manually formed into a functional profile or shape, such as with a crease or fold, on a job site without tools. Further, sections of polyethylene thermoplastic step flashing can mold to adjacent stepped materials to prevent infiltration of water and foreign materials and also reduce the number of penetrating fasteners needed to secure the step flashing to the building. As a result of reducing the number of fasteners used, fewer penetrations are required in the roof, further reducing the possibility of a leak occurring. Additionally, polyethylene thermoplastic self-seals against the penetrating fasteners used to secure the sections of step flashing to the roof. In this manner, the step flashing of the present disclosure further improves installation efficiency by reducing or eliminating the need to apply a sealant over or around the fastener.

Because polyethylene thermoplastic is non-corrosive, productivity is further increased because no special installation techniques, expensive fasteners, or precautions are required to prevent contact between the section of flashing and other roofing materials. Individual sections of polyethylene thermoplastic step flashing can be easily cut using a conventional knife or razor. Moreover, the cut edges of sections of polyethylene thermoplastic step flashing do not require sealing because the polyethylene thermoplastic material is non-corrosive.

Another benefit of the step flashing of the present disclosure is that adjacent (or overlapping) sections of step flashing formed of polyethylene thermoplastic may be heat welded or ultrasonically welded together. Accordingly, during installation, a first section of step flashing may be welded to a second section of step flashing. In this manner, a seamless, or substantially seamless, structure may be formed.

Step flashing comprising polyethylene thermoplastic and ultraviolet light (UV) absorbers and/or UV inhibitors is also more durable and has improved water resistance when compared with known step flashing made of other materials, thereby decreasing future repair/replacement costs. Further, unlike step flashing made of metal, the step flashing of the present disclosure is non-conductive and thus may be less susceptible to damage caused by lightning. Finally, because polyethylene thermoplastic step flashing of this disclosure is non-reflective, it is aesthetically pleasing and does not require coatings to prevent contrast with other roofing materials.

Thus, one aspect of the present disclosure provides step flashing comprising a polyethylene thermoplastic with at least one of a UV light absorber and a UV light inhibitor. In a specific embodiment, a section of step flashing comprises a body comprising polyethylene thermoplastic having a length and a width, each between about 8 inches and about 12 inches, and a thickness of between about 0.25 mm and about 1.0 mm (about 10 mils to about 40 mils). The body preferably contains a fold to form a vertical projecting portion and a horizontal projecting portion. In one embodiment, an angle between the vertical projecting portion and the horizontal projecting portion is between about 45 degrees and about 135 degrees. Optionally, the vertical projecting portion includes a protrusion. In one embodiment, a distance between the fold and a center of the protrusion is about one-half the width of the vertical projecting portion. In another embodiment, the distance between the fold and the center of the protrusion is about 2.5 inches. The protrusion has a height of less than about 1 inch. The polyethylene thermoplastic comprises at least one of a low density polyethylene (LDPE), a high density polyethylene (HDPE), a high molecular weight polyethylene (HMW PE), and an ultra-high molecular weight polyethylene (UHMW PE).

Another aspect of the present disclosure provides an apparatus capable of forming a film of polyethylene thermoplastic into sections of step flashing of various sizes and shapes. More specifically, in one embodiment the apparatus comprises a loader operable to receive a coil of film and align the film in a slitter that is operable to take in the film. The slitter includes adjustable blades operable to cut the film into strips of a predetermined width. The slitter includes a table portion with a substantially flat upper surface having a width of between about 20 feet and about 26 feet. The apparatus also includes a folder operable to receive each of the strips and fold each of the strips to a predetermined angle. The folder can also cut each of the strips into sections of step flashing of a predetermined length.

Optionally, the apparatus may include a decorator. The decorator forms a decoration on the film of polyethylene thermoplastic or the sections of step plashing. In one embodiment, the decoration simulates the texture and/or color of other conventional roofing materials such as asphalt shingles, wood shingles, slate shingles, and roofing tiles. In one embodiment, the decorator transfers at least one of an ink, a paint, and a pigment to the polyethylene thermoplastic. The decorator may comprise an ink jet printing system or an off-set printing device. In another embodiment, the decorator alters the surface of the polyethylene thermoplastic to form at least one of a ridge, a protrusion, and a depression. Accordingly, the decorator may further comprise a tool that contacts the polyethylene thermoplastic to form the ridge, protrusion, or depression. Additionally, the decorator may include a laser and/or a cutting tool to remove at least some materials from the polyethylene thermoplastic to form the ridge, protrusion, or depression.

Another aspect of the present disclosure is a method of manufacturing sections of step flashing of various sizes and shapes. This method includes, but is not limited to: (1) providing a coil of film of polyethylene thermoplastic combined with at least one of a UV absorber and a UV inhibitor; (2) positioning the coil on a loader; (3) aligning the film with a slitter; (4) feeding the film into the slitter; (5) cutting one or more strips from the film; (6) moving the one or more strips into a folder; (7) folding each of the one or more strips to a predetermined angle; and (8) cutting each of the one or more strips into a plurality of sections of step flashings of a predetermined length. Optionally, the method further includes forming a protrusion in a vertical projecting portion of each section of step flashing. In one embodiment, the protrusion is generally parallel to the fold. Optionally, the sections of step flashing may be produced without the fold by omitting the folding.

In one embodiment, the polyethylene thermoplastic comprises at least one of a low density polyethylene (LDPE), a high density polyethylene (HDPE), a high molecular weight polyethylene (HMW PE), and an ultra-high molecular weight polyethylene (UHMW PE).

The method may further comprise forming a decoration on at least one surface of the step flashing. The decoration may comprise at least one of an ink, a paint, and a pigment applied to the at least one surface. Additionally or alternatively, the decoration may comprise at least one of a ridge, a protrusion, and a depression formed in the at least one surface.

Yet another aspect of the present invention to provide a roofing component comprising polyethylene thermoplastic that does not degrade due to exposure to (UV). The polyethylene thermoplastic includes at least one of a UV inhibitor and a UV absorber. The polyethylene thermoplastic may comprise one or more of a LDPE, a HDPE, a HMW PE, and an UHMW PE. In one preferred embodiment, the polyethylene thermoplastic comprises HDPE. In one embodiment, the roofing component is a piece of step flashing. In another embodiment, the roofing component is a shingle or roof tile.

Any suitable UV inhibitor and UV absorber may be used with the roofing component of all embodiments of the present disclosure. In one embodiment, the UV absorber is carbon black. The carbon black may comprise from about 1 wt. % to about 15 wt. % and is substantially uniformly mixed with the polyethylene thermoplastic. In another embodiment, the UV absorber is a colorant added to the polyethylene thermoplastic or applied to at least one surface of the polyethylene thermoplastic.

In one embodiment, the roofing component is formed of two or more layers of polyethylene thermoplastic. Optionally, in one embodiment the two or more layers of polyethylene thermoplastic may be combined or bonded with at least one different material. Optionally, a first layer may comprise one of a LDPE, a HDPE, a HMW PE, and an UHMW PE and a second layer may comprise a different one of a LDPE, a HDPE, a HMW PE, and an UHMW PE. The two or more layers of polyethylene thermoplastic may each have a different color and may include different UV inhibitors and UV absorbers. Accordingly, in one embodiment, the roofing component has a first side of a first color and a second side of a second color. In one embodiment, the first color is substantially black and the second color is off-white.

The two or more layers of polyethylene thermoplastic may be combined to form the roofing component by any suitable manner. In one embodiment, each of the two or more layers of polyethylene thermoplastic are individually extruded and then combined (or bonded) under pressure. In another embodiment, the two or more layers are coextruded. In one embodiment, the roofing component is formed of three layers of polyethylene thermoplastic.

In one embodiment, the roofing component comprises step flashing with a body comprising a length and a width of between about 8 inches and about 12 inches. The body has a thickness of between about 0.25 mm and about 1.0 mm. Optionally, the step flashing may include a fold to form a vertical projecting portion and a horizontal projecting portion. The angle of the fold between the vertical and horizontal projecting portions may be between about 45 degrees and about 135 degrees. Additionally, a protrusion may optionally be formed on the vertical projecting portion. The protrusion generally extends within an interior of the fold angle when the step flashing includes the fold.

Optionally, the roofing component may include a textured surface to simulate wood, tile, slate, or an asphalt shingle with an aggregate. Additionally, the roofing component may optionally include a decoration applied to at least one surface. The decoration may comprise at least one of an ink, a paint, and a pigment and may also simulate wood, tile, slate, or an asphalt shingle. In one embodiment, the roofing component includes a three-dimensional relief simulating a natural material such as, but not limited to, one or more of wood shake, tile, slate, and an asphalt shingle.

These and other advantages will be apparent from this disclosure. The above-described embodiments, objectives, and configurations are neither complete nor exhaustive. As will be appreciated, other embodiments are possible using, alone or in combination, one or more of the features set forth above or described below. Further, the Summary is neither intended nor should it be construed as representing the full extent and scope of the present disclosure. The present disclosure is set forth in various levels of detail in the Summary, and, in the attached drawings and the Detailed Description and no limitation as to the scope of the present disclosure is intended to either the inclusion or non-inclusion of elements, components, etc. in this Summary. Additional aspects of the present disclosure will become more readily apparent from the detailed description, particularly when taken with the drawings.

BRIEF DESCRIPTION OF THE DRAWINGS

The accompanying drawings, which are incorporated in and constitute a part of the specification, illustrate embodiments of the present disclosure and together with the general description given above and the detailed description of the drawings given below, serve to explain the principles of these embodiments.

FIG. 3 is a perspective view of a flashing assembly shown uninstalled and free-standing with partial hidden lines;

FIG. 4A is a perspective view of a section of flashing according to one embodiment of the present disclosure;

FIG. 4B is a perspective view of a section of flashing according to another embodiment of the present disclosure;

Figure 1:
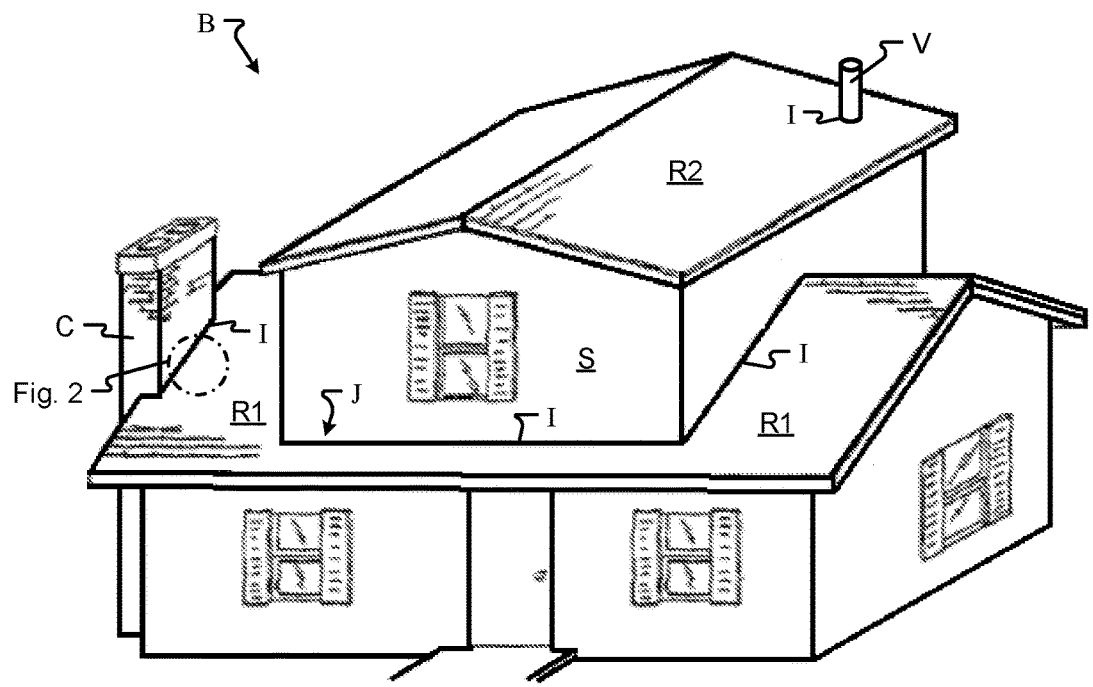
FIG. 1 is an elevated perspective view of a structure that is installed with a flashing assembly according to the present disclosure.
Figure 2:
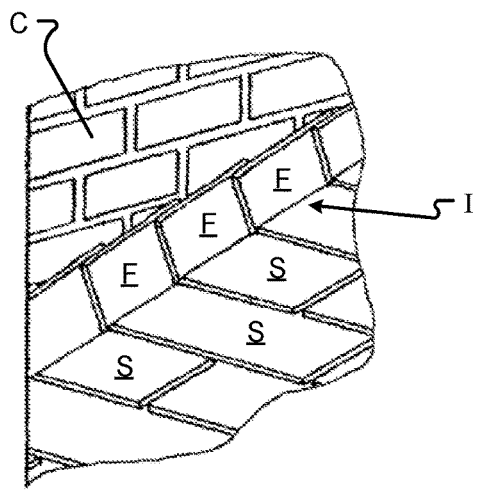
FIG. 2 is a detail view of FIG. 1 of a portion of the structure and the flashing assembly of FIG. 1.

It should be understood that the drawings are not necessarily to scale. In certain instances, details which are not necessary for an understanding of the disclosure or which render other details difficult to perceive may have been omitted. It should be understood, of course, that the disclosure is not necessarily limited to the particular embodiments illustrated herein.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof is meant to encompass the items listed thereafter and equivalents thereof as well as additional items.

References made herein to "flashing," "step flashing," "sections of step flashing" or aspects thereof should not necessarily be construed as limiting the present disclosure to a particular type, shape, or size of flashing or other roofing component. It will be recognized by one skilled in the art that the present disclosure may be used with flashing and roofing components of all shapes, sizes, and configurations. For example, referring to FIG. 1, head wall J (also referred to as continuous flashing) may be formed using the materials and methods of the present disclosure, to form a section that may be between 1 foot and 10 feet, or more, in length, and may have either equal or unequal length sides extending from a fold in the section. Further, the present disclosure may be used to form shingles, tiles, and other components of a roof from polyethylene thermoplastic.

References herein to polyethylene thermoplastic flashing, polyethylene thermoplastic film, or a polyethylene thermoplastic film or flashing comprising carbon black, etc. mean a sheet of polyethylene thermoplastic comprising between about 1 wt. % and about 15 wt. % carbon black. Preferably, these sheets comprise between about 2 wt. % and about 3 wt. % carbon black, and more preferably between about 2 wt. % and about 2.5 wt. % carbon black. Carbon black is a form of nearly pure, elemental carbon that differs in molecular structure from the more common forms of elemental carbon—graphite and diamond—and therefore also differs in physical properties. Carbon black is softer than either graphite or diamond and is intensely black in color. Carbon black is manufactured by burning hydrocarbon fuels in a controlled manner with insufficient oxygen for complete combustion. Kerosene is the most common hydrocarbon used in the manufacture of carbon black. It will be appreciated by one of skill in the art that other UV absorbers and UV inhibitors may be mixed with the polyethylene thermoplastic to protect the polyethylene thermoplastic flashing from UV degradation.

In the roof flashing of this disclosure and the starting materials used to produce the same, UV light absorbers may be used as both a pigment and an ultraviolet light absorber. Many plastic/polymeric materials are degraded by the spectrum of light frequencies at the higher energy (ultraviolet) end of the light spectrum of sunlight. The photo degradation causes the plastic material to become more brittle, leading to loss of mechanical properties and/or discoloration, cracking, fading, and chalking. This is obviously unacceptable in a roofing material. Therefore, in one embodiment of the present disclosure, the flashing of this disclosure includes a carbon black component between about 1 wt % and about 15 wt %, which is added to the polyethylene thermoplastic, such as HDPE, during the production of the film. The carbon black absorbs or screens out the damaging UV light and transforms the UV energy into heat, which is dissipated harmlessly throughout the product. Further, references to "carbon black" should not be construed as limiting the present disclosure to a particular type or brand of material, but include acetylene black, channel black, furnace black, lamp black and thermal black. As will be appreciated by one of skill in the art, any other suitable UV inhibitors and UV absorbers may be added to the polyethylene thermoplastic. Some examples of UV inhibitors and UV absorbers are described in U.S. Pat. Nos. 6,536,177 and 8,206,807 which are each incorporated herein by reference.

Although generally described herein in conjunction with "HDPE," "HDPE combined with carbon black," and "high density polyethylene," it should be appreciated that the apparatus and method of the present disclosure may be used to manufacture sections of step flashing of any variety of materials, including polyethylene thermoplastic. Accordingly, the step flashing of the present disclosure may comprise at least one of a low density polyethylene (LDPE), a high density polyethylene (HDPE), a high molecular weight polyethylene (HMW PE), and an ultra-high molecular weight polyethylene (UHMW PE).

Referring now to FIG. 3, a flashing assembly 304 is described for use in the intersection joint (I) of a structure similar to the building (B) of FIG. 1. The flashing assembly 304 is made from a plurality of overlapping flashing sections 308. The overlapping relationship of the flashing sections 308 is established as depicted by the structure and the dashed lines 312.

Although not reflected in detail in the various figures, both a "left-handed" and a substantially mirror image "right-handed" version of the flashing sections 308 of the present disclosure are contemplated for use about the various intersections I of the roof R1. Preferably, the overlapping edge portions are substantially flush and do not form any substantial interstice therebetween to minimize the possibility that moisture and/or foreign substance(s) can enter. Optionally, the overlapping edges of adjacent flashing sections 308 may be heat welded or ultrasonically welded together.

Each of the flashing sections 308 is formed from a film of HDPE material (or another type of polyethylene thermoplastic) as described below. Each flashing section 308 is further formed to have a vertical projecting portion 316 and a horizontal projecting portion 320 connected by a fold 324. In one embodiment, a flat sheet of flashing is manually folded on site during installation to form the vertical and horizontal projecting portions 316, 320. The vertical and horizontal projecting portions 316, 320 establish a generally L-shaped configuration, as can be best understood with reference specifically to FIG. 4A. Preferably, the L-shaped configuration of portions 316, 320 is formed to have an inside angle 404, that is between about 45 and 135 degrees, and is more preferably between about 60 degrees 120, and is most preferably about 90 degrees. A width 408 of the vertical projecting portion 316 may be substantially equal to a width 412 of the horizontal projecting portion 320. The width 408 may be between about 2.5 inches and about 6 inches. In a preferred embodiment, the width 408 of the vertical projecting portion 316 is about 5 inches. In a more preferred embodiment, the width 408 is about 4 inches.

The width 412 of the horizontal projecting portion 320 may be between about 2.5 inches and about 6 inches. In a preferred embodiment, the width 412 is about 5 inches. In a more preferred embodiment, the width 412 is about 4 inches.

The flashing section 308 has a length 416 of between about 7 inches and about 12 inches. In one embodiment, the length 416 is about 8 inches. In another embodiment, the length 416 is about 10 inches. In a preferred embodiment, the length 416 is about 12 inches. In a still more preferred embodiment, the length 416 is about 8 inches.

Referring now to FIG. 4B, additionally or alternatively, a protrusion 420 can be formed in the vertical projecting portion 316A of a flashing section 308A. The protrusion 420 can further prevent infiltration of water into the structure of the roof R. The distance 422 between the fold 324 and the center of the protrusion 420 is about one-half of the width 408 of the vertical projecting portion 316A. However, as will be appreciated by those of skill in the art, it should be understood that the protrusion 420 can be located closer to, or further from, the fold 324. In one embodiment, the distance 422 between the fold 324 and the center of the protrusion is about 2.5 inches. In a more preferred embodiment, the distance 422 between the fold 324 and the center of the protrusion is about 2 inches. The protrusion 420 has a height 424 of less than about 1 inch. In one embodiment, the protrusion 420 has a height of about 0.5 inches. The protrusion 420 can have a generally round or square shape and is not limited to the generally V-shape illustrated in FIG. 4B. In another embodiment the protrusion 420 is substantially parallel to a free edge of the vertical projecting portion 316. In still another embodiment, a distal end 428 of the protrusion 420 is a greater distance from the fold 324 than an upper fold 432 of the protrusion 420. Said another way, in one embodiment the protrusion 420 has a cross-sectional shape that is generally "V" shaped with the open end of the V facing upwardly. In this manner, the protrusion 420 provides a channel that guides water away from the fold 324.

While various dimensions and angles have been provided to illustrate one exemplary embodiment of a flashing section 308, it is expressly contemplated that dimensions and angles may be varied in flashing section 308 and still comport with the scope and spirit of the present disclosure. Further, it will be appreciated that the flashing sections 308 may be cut during installation. Accordingly, the flashing assembly 304 may comprise flashing sections 308 with a variety of lengths and widths.

Figure 5:
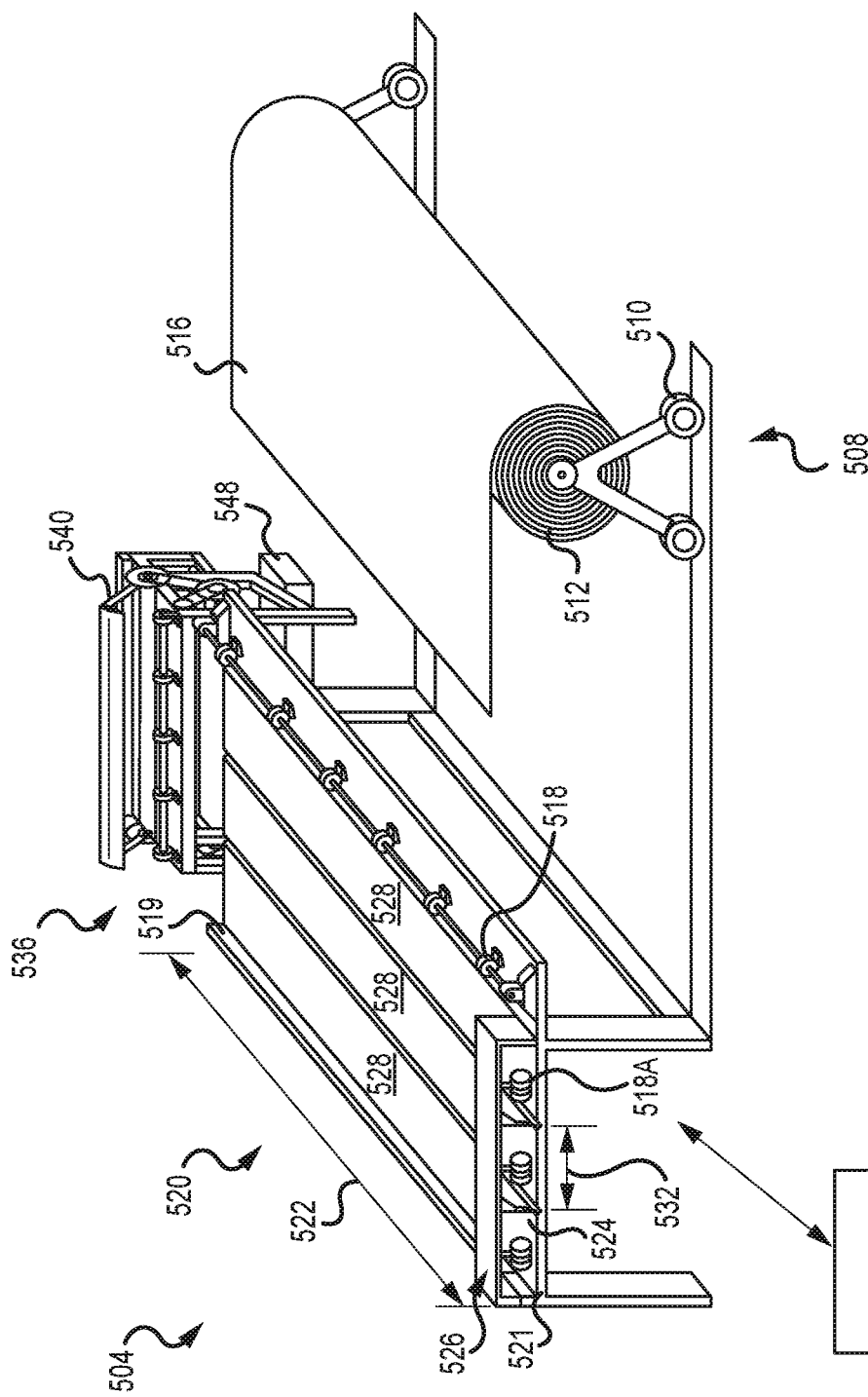
FIG. 5 is a schematic illustration of an apparatus for forming sections of flashing according to one embodiment of the present disclosure.

Referring now to FIG. 5, an apparatus 504 for manufacturing sections 308 of step flashing according to one particular embodiment is illustrated. The apparatus 504 includes a loader 508 operable to receive a coil 512 of polyethylene thermoplastic film 516. Coils 512 of suitable film 516 are commercially available from various suppliers. The film 516 can be of any thickness. In one embodiment, the film 516 has a thickness of between about 0.25 mm and about 1 mm (between about 10 mils and about 40 mils). In a preferred embodiment, the film 516 has a thickness of between about 0.5 mm and about 0.75 mm (between about 20 mils and about 30 mils).

The coils 512 can be of any length and are supplied in various widths. In one embodiment, the loader 508 is adapted to receive a coil 512 of between about 3 feet and about 30 feet in width. In a preferred embodiment, the loader 508 is adapted to receive a coil 512 having a width of between about 20 feet and about 25 feet. In a more preferred embodiment, the loader 508 is adapted to receive a coil 512 having a width of between about 22 feet and about 23 feet.

The coils 512 generally are supplied with about 1,100 feet, or more, of film 516. Therefore, the loader 508 is adapted to receive coils 512 of various weights. In one embodiment, the loader 508 is adapted to receive a coil 512 having a weight of greater than 100 pounds. In another embodiment, the loader 508 is adapted to receive a coil 512 having a weight of greater than 3,500 pounds. In a preferred embodiment, the loader 508 is adapted to receive a coil 512 having a weight of at least 5,000 pounds.

The loader 508 may optionally include wheels 510 that enable the loader 508 to be moved laterally in relation to a slitter 520. The loader 508 is operable to unroll the film 516 from the coil 512 and align the film 516 with the slitter 520.

The slitter 520 has a table portion 521 with a substantially flat upper surface. As will be appreciated by one of skill in the art, the table portion 521 of the slitter 520 may be of any width 522 that is about equal to, or greater than, the width of the coil 512. In one embodiment, the width 522 is between about 3 feet and about 30 feet. In another embodiment, the table has a width 522 of between about 20 feet and about 26 feet. In a more preferred embodiment, the table portion 521 has a width 522 of about 23 feet.

The slitter 520 optionally includes tools, such as rollers 518, draw pads, stop blocks, draw clips, and the like to draw the film 516 onto the table portion 521 and align the film 516 on the table portion. Additionally or alternatively, the slitter 520 may include a stop block 519 to help align the film 516 and/or measure a desired about of film 516 on the table portion 521.

Figure 5A:
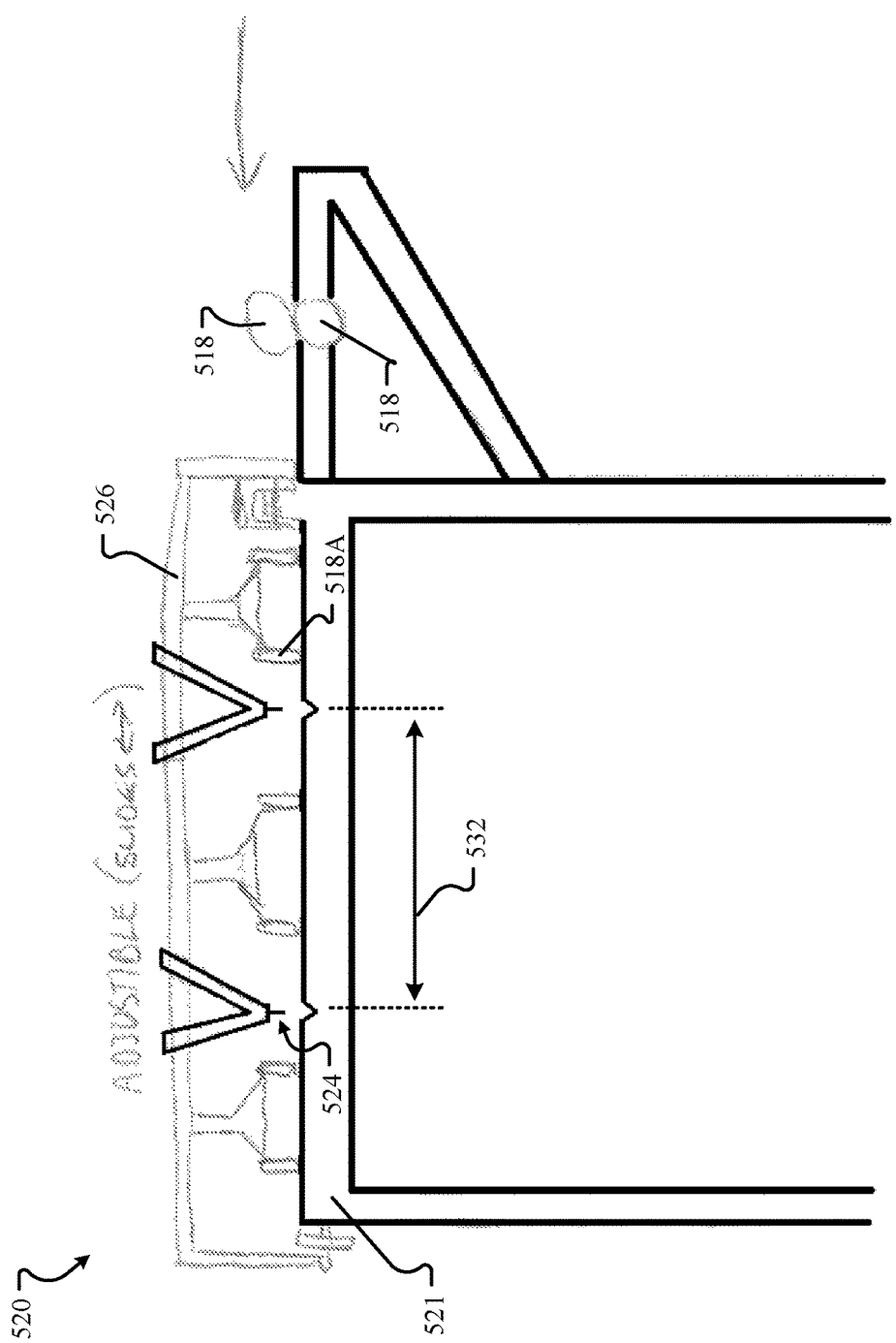
FIG. 5A is a front elevation view of a slitter according to one embodiment of the present disclosure.

The slitter 520 includes a moveable assembly 526 having one or more cutting elements 524, as best seen in FIG. 5A. The cutting elements 524 can be stationary or rotating blades, such as rotating discs with a sharpened circumference. The cutting elements 524 can have a generally straight cutting surface or, optionally, can be serrated. For example, in one embodiment, each of the cutting elements 524 comprises a steel rule die, a rotary die, or any other tool operable to slit or cut the film 516. Additionally or alternatively, the cutting elements 524 may comprise one or more lasers (not illustrated) or other tools operable to cut the film 516.

After the film 516 is positioned on the table portion 521, the assembly 526 moves substantially parallel to the width 522 of the slitter 520 to cut the film 516 into strips 528 of a predetermined width 532. The assembly 526 includes wheels or rollers 518A that support the assembly and help keep the film 516 flat against the surface of the table portion 521 while the cutting elements 524 are cutting the film 516.

The distance 532 separating the cutting elements 524 can be adjusted to cut each strip 528 to an about equal width 532. Additionally or alternatively, the cutting elements 524 can be adjusted to cut strips 528 having different widths. In one embodiment, the cutting elements 524 can be adjusted to be separated by a distance 532 of between about 7 inches and about 12 inches. In one embodiment, the cutting elements 524 are separated by a distance 532 of about 8 inches. In another embodiment, the cutting elements 524 are separated by a distance 532 of about 10 inches. In still another embodiment, the cutting elements 524 are separated by a distance 532 of about 12 inches.

Although FIG. 5 illustrates the slitter 520 cutting the film 516 into three strips 528, it should be understood that the slitter 520 can include any number of cutting elements 524 to cut any number of strips 528 simultaneously from the film 516. For example, the assembly 526 can include a sufficient number of cutting elements 524 to cut 3, 4, 5, 10, 20, or more strips 528 simultaneously from the film 516.

Figure 5B:
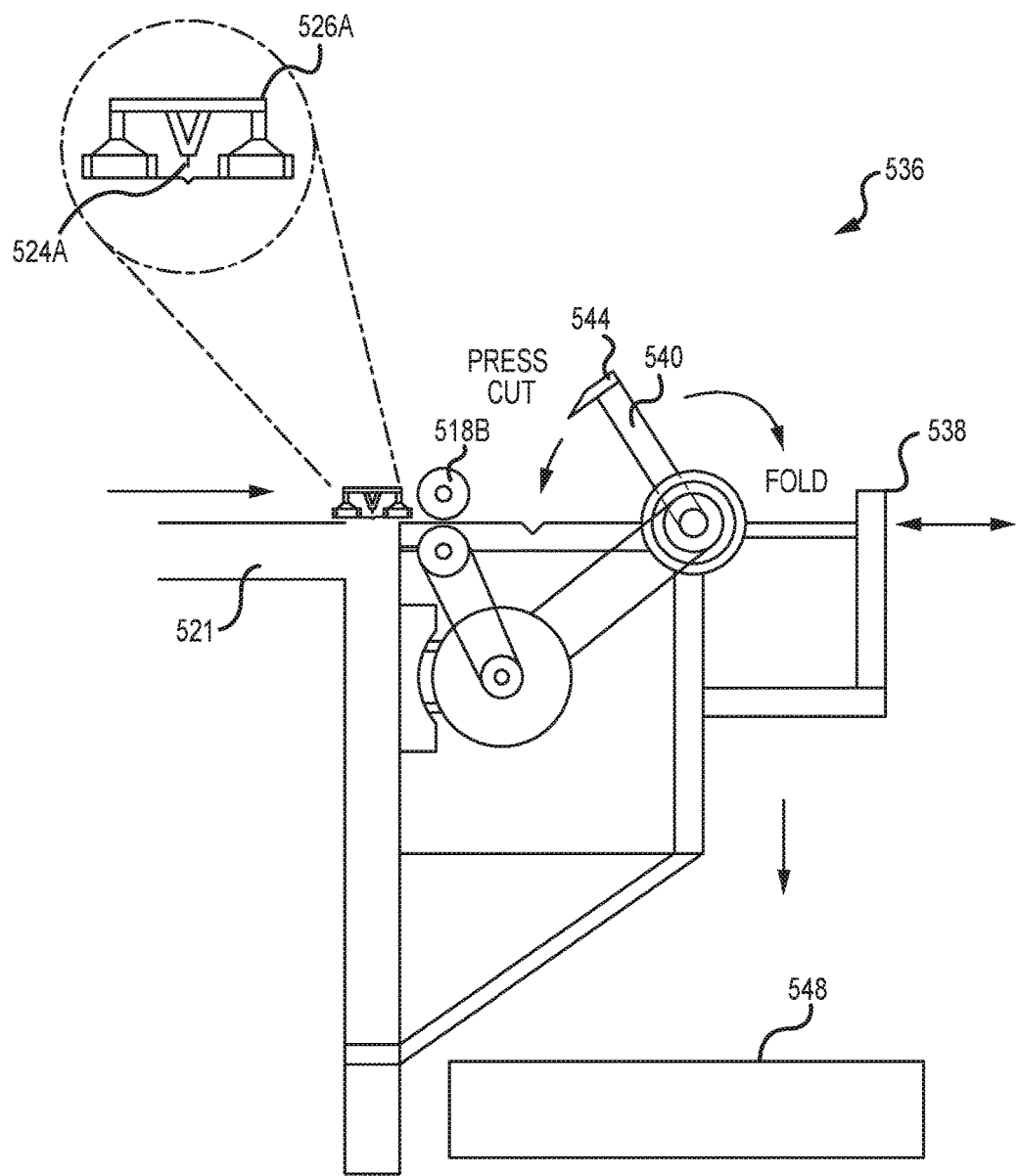
FIG. 5B is a left side elevation view of a folder according to one embodiment of the present disclosure.
Figure 5C:
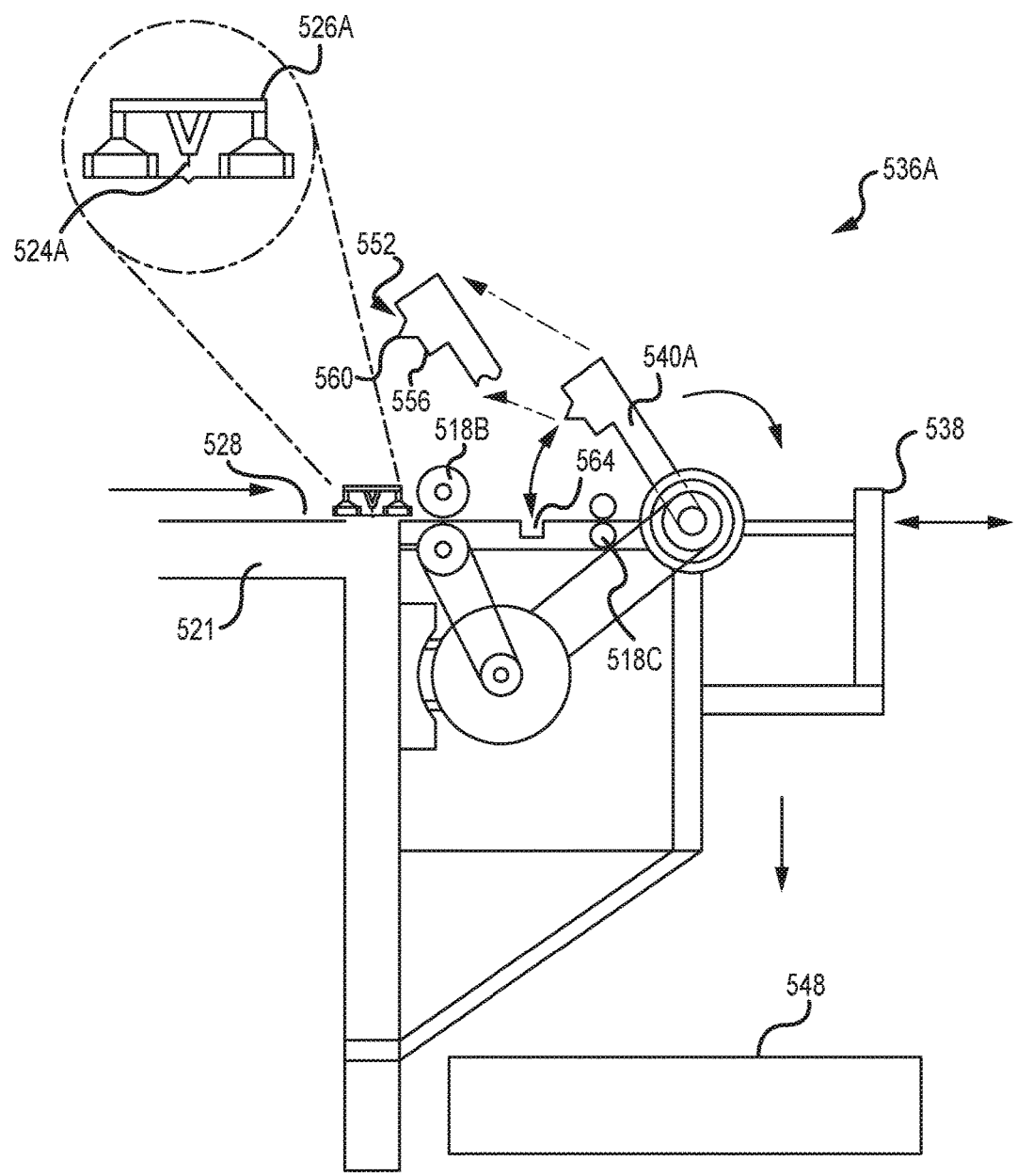
FIG. 5C is a left side elevation view of another embodiment of a folder according to the present disclosure.

After the cutting elements 524 cut the film 516, the strips 528 are moved to a folder 536, best seen in FIGS. 5B and 5C. The apparatus 504 includes tools, such as rollers 518B, draw pads, stop blocks, and draw clips to move the strips 528 into the folder 536 and align the strips 528 with the folder 536.

Referring now to FIG. 5B, the folder 536 includes an adjustable stop block 538 that can move left and right to adjust the position of the fold of each strip 528. A lever arm 540 rotates to optionally fold each of the strips 528 to a predetermined angle, although the strips can be left substantially flat. As viewed from the left elevation in FIG. 5B, the lever arm 540 rotates clockwise to fold each strip 528. The lever arm 540 then rotates counterclockwise and a blade 544 interconnected to the lever arm 540 presses into each strip 528 to cut a section of step flashing. Additionally or alternatively, the folder 536 may include a cutting assembly 526A, which is identical, or similar, to the cutting assembly 526 of the slitter 520. The cutting assembly 526A is positioned to cut the strips 528 substantially perpendicular to the cuts made by assembly 526 of the slitter. The cutting assembly 526A is illustrated in FIG. 5B to the left of roller 518B, but, as will be appreciated by those of skill in the art, the cutting assembly 526A can be located on the right side of roller 518B or at any other position of the folder 536. After being cut by the blade 544 of the lever 540 or the cutting element 524A of the cutting assembly 526A, the sections of step flashing are collected in a stacker 548.

Referring now to FIG. 5C, another embodiment of the folder 536A is illustrated. Folder 536A includes a lever 540A that can fold each strip 528 to a predetermined angle as described above. The lever 540A includes a protrusion forming surface 552 adapted to form the protrusion 420 on the vertical projecting portion 316A of the step flashing 308A. The protrusion forming surface 552 has a width of about 1.5 inches and includes generally flat contact surfaces 556 to hold the film 516 against the table 521. The protrusion forming surface 552 also includes a projecting portion 560 with a shape adapted to form a protrusion 420 of a predetermined shape. Additionally or alternatively, the projecting portion 560 can retract and extend from the protrusion forming surface 552. When the lever 540A rotates counterclockwise to contact the film 516, the projecting portion 560 is in a retracted position. After the contact surfaces 556 press and hold the film 516 against the table 521, the projecting portion 560 extends to press against the film 516 to form the protrusion 420. Although the projecting portion 560 is illustrated in FIG. 5C as having a generally triangular shape, those of skill in the art will appreciate that the projecting portion 560 can have any shape, including a generally round or flat shape to form a protrusion 420 of a predetermined shape.

The table 521 optionally includes a rabbet or groove 564 positioned to align with the protrusion forming surface 552 of the lever 540A. The groove 564 has a width of about 1 inch and a depth of less than about 1 inch.

The protrusion 420 can be formed on the step flashing 308 before or after the lever 540A folds the step flashing 308. The folder 536A optionally includes additional rollers 518C that apply a sufficient amount of force to the step flashing 308 to move the step flashing without compressing the protrusion 420.

Referring again to FIG. 5, the apparatus 504 may optionally include a decorator 552 that can form a predetermined decoration on one or more sides of the film 516. For example, the decorator 552 can form a decoration to simulate wood, tile, slate, or an asphalt shingle with an aggregate. In one embodiment, the decorator 552 comprises a tool that contacts and applies a force to at least one surface of the film 516. The tool may comprise a stamp that forms one or more of contours, projections, or depressions on the at least one surface of the film 516. In one embodiment, the tool comprises a roller with a textured circumference that contacts the at least one surface. Alternatively, the decorator 552 comprise a printing device such as an ink-jet printer or an off-set printer. Accordingly, the decorator 552 may apply at least one of an ink, a paint, and a pigment to the at least one surface to form the decoration. Optionally, the at least one surface that will receive the decoration may be treated to improve the adhesion of the decorating materials to the at least one surface. Any method of treating the polyethylene thermoplastic of the step flashing sections 308 may used with the step plashing of the present disclosure. For example, one or more of a corona treatment, a plasma treatment, and a heat or flame treatment may be used to improve the adhesion of polyethylene thermoplastic before the decorating materials are applied. Methods and apparatus used to treat surfaces of plastics including polyethylene thermoplastic are known and described at http://www.enerconind.com/corona-pretreatment-machine.aspx, which is incorporated herein by its entirety for all that it teaches.

Additionally or alternatively, the decorator 552 may include a cutting tool, such as at least one laser or a mechanical cutting tool, that removes at least a portion of the at least one surface to form at least a portion of the decoration. As will be appreciated, the decorator 552 may form the decoration at any time during the formation of the set flashing sections. In one embodiment, the decorator 552 forms the decoration on one or more of the film 516, the strips 528, and the cut step flashing sections 308.

Figure 6:
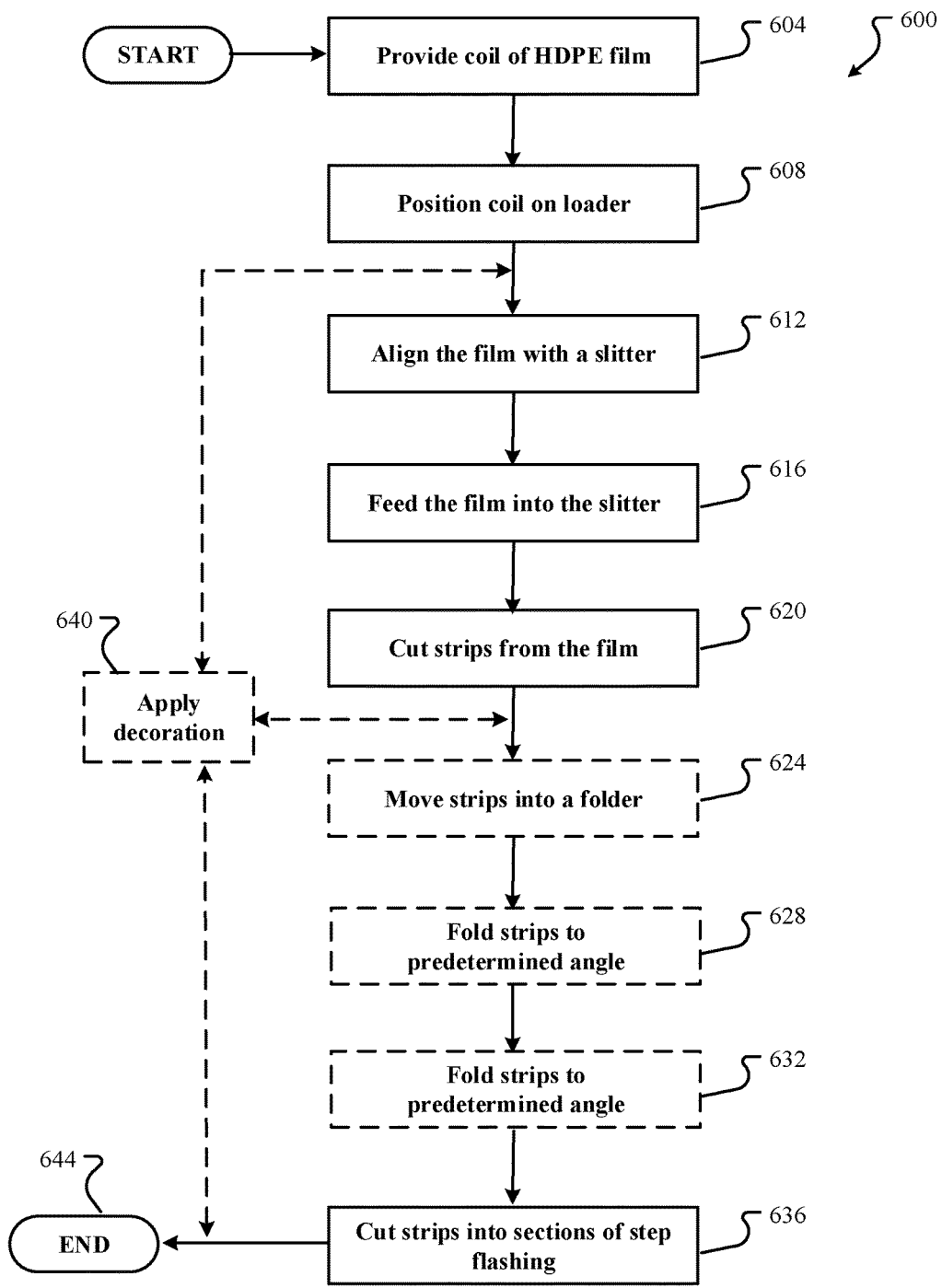
FIG. 6 is a flowchart of a method of forming sections of step flashing according to one embodiment of the present disclosure.

Referring now to FIG. 6, a method 600 of forming sections of step flashing according to one embodiment is illustrated. While a general order of the steps of the method 600 are illustrated in FIG. 6, the method 600 can include more or fewer steps or the order of the steps may be arranged differently than the method 600 illustrated in FIG. 6 and described herein. Additionally, although the operations of method 600 may be described sequentially, many of the operations may in fact be performed in parallel or concurrently. Hereinafter, the method 600 shall be explained with reference to the systems and apparatus described in conjunction with FIGS. 1-5.

A coil 512 of polyethylene thermoplastic film 516 with at least one of a UV absorber and a UV inhibitor is provided in step 604. In one embodiment the polyethylene thermoplastic comprises HDPE. Optionally, the polyethylene thermoplastic may also comprise one or more of a LDPE, a HMW PE, and an UHMW PE. In one embodiment, the UV absorber is carbon black. The coil 512 is positioned on the loader 508 in step 608 and aligned with the slitter 520 in step 612. The film 516 is fed or drawn 616 into the slitter 520. The slitter cuts 620 one or more strips 528 from the film 516 using cutting elements 524. The strips 528 are optionally moved 624 to the folder 536 and optionally folded 628 to a predetermined angle. Additionally or alternatively, a protrusion 420 is formed 632 in the strips 528. The strips 528 are each cut to produce individual sections of step flashing 308 in step 636 and the sections of step flashing 308 are collected in stacker 548.

Optionally, a decorator 552 may form a decoration on the polyethylene thermoplastic in operation 640 as described above. The decoration may be formed on the polyethylene thermoplastic after any operation of method 600. More specifically, the decorator 552 may form the decoration on the coil 512 after the coil is positioned on the loader in operation 608. The method 600 may then proceed to operation 612. Alternatively, the decoration may be formed after the slitter 520 cuts the film 516 into strips 528 in operation 620. After the decorator 552 forms the decoration on the strips 528, the method 600 may proceed to operation 624. In another embodiment, the decorator 552 forms the decoration on the sections of step flashing 308 after operation 636. In this embodiment, after the decoration is formed, the method 600 proceeds to end operation 644.

While various embodiments of the present disclosure have been described in detail, it is apparent that modifications and alterations of those embodiments will occur to those skilled in the art. However, it is to be expressly understood that such modifications and alterations are within the scope and spirit of the present disclosure, as set forth in the following claims. Further, the embodiment(s) described herein is capable of other embodiments and of being practiced or of being carried out in various ways.

What is claimed is:

1. A roofing component, comprising:
   at least a first layer and a second layer of polyethylene thermoplastic, the first layer having a first color and the second layer having a second color, wherein the roofing component has a first side of the first color and a second side of the second color; and
   a UV absorber comprising between approximately 1 and less than 3 wt. % carbon black substantially uniformly mixed with the polyethylene thermoplastic.

2. The roofing component of claim 1, wherein the first layer and the second layer of polyethylene thermoplastic comprise a high density polyethylene (HDPE).

3. The roofing component of claim 1, wherein the UV absorber comprises between approximately 2 and approximately 2.5 wt. % carbon black.

4. The roofing component of claim 1, wherein the roofing component comprises a step flashing with a body comprising:
   a length and a width of between about 8 inches and about 12 inches;
   a thickness of between about 0.25 mm and about 1.0 mm; and
   a fold to form a vertical projecting portion and a horizontal projecting portion, wherein a fold angle between the vertical projecting portion and the horizontal projecting portion is between about 45 degrees and about 135 degrees.

5. The roofing component of claim 4, further comprising:
   a protrusion formed on the vertical projecting portion, the protrusion extending within an interior of the fold angle.

6. The roofing component of claim 1, wherein the roofing component comprises a shingle.

7. The roofing component of claim 1, wherein the first layer and the second layer are one of individually extruded and coextruded.

8. The roofing component of claim 1, wherein the first color is substantially black and the second color is off-white.

9. The roofing component of claim 1, wherein at least one surface of the roofing component has a three-dimensional relief simulating a natural material comprising any one of wood shake, tile, and slate.

10. The roofing component of claim 1, wherein at least one surface of the roofing component includes a decoration comprising at least one of an ink and a paint applied to the at least one surface.

11. The roofing component of claim 1, wherein at least one surface of the roofing component includes a pigment.

12. A step flashing, comprising:
   a first layer of a high density polyethylene (HDPE) having a first color; and
   a second layer of a HDPE having a second color, wherein the first and second layers include between approximately 1 and less than 3 wt. % carbon black, and wherein the step flashing has a thickness of between about 0.25 mm and about 1.0 mm.

13. The step flashing of claim 12, wherein the first color is substantially black and the second color is approximately white.

14. The step flashing of claim 12, wherein the carbon black is substantially uniformly mixed with the HDPE of the first and second layers.

15. The step flashing of claim 12, wherein the first layer and the second layer are one of individually extruded and coextruded.

16. The step flashing of claim 12, wherein the first and second layers include between approximately 2 and approximately 2.5 wt. % carbon black.

17. The step flashing of claim 12, wherein at least one surface of the step flashing is decorated with at least one of an ink and a paint.

* * * * *